(12) United States Patent
Martin

(10) Patent No.: US 10,367,411 B2
(45) Date of Patent: Jul. 30, 2019

(54) INTERLEAVED BOOST CONVERTER WITH HOLDUP TIME EXTENSION

(71) Applicant: Analog Devices Global Unlimited Company, Hamilton (BM)

(72) Inventor: Francis Martin, Mandaluyong (PH)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 15/849,047

(22) Filed: Dec. 20, 2017

(65) Prior Publication Data

US 2019/0190370 A1    Jun. 20, 2019

(51) Int. Cl.
| | |
|---|---|
| *H02M 7/04* | (2006.01) |
| *H02M 1/42* | (2007.01) |
| *G05F 1/70* | (2006.01) |
| *H02M 1/32* | (2007.01) |
| *H02M 7/219* | (2006.01) |
| *H02M 3/337* | (2006.01) |

(52) U.S. Cl.
CPC ............ *H02M 1/4225* (2013.01); *G05F 1/70* (2013.01); *H02M 1/32* (2013.01); *H02M 3/3376* (2013.01); *H02M 7/219* (2013.01)

(58) Field of Classification Search
CPC .. H02M 1/4225; H02M 3/1584; H02M 7/219; H02M 7/04; G05F 1/70
USPC ...... 363/16, 17, 21.02, 21.16, 37, 45, 46, 71, 363/78, 89, 126, 127; 323/207, 222, 271, 323/273, 282–288
See application file for complete search history.

(56) References Cited

U.S. PATENT DOCUMENTS

| | | | |
|---|---|---|---|
| 4,811,190 A | 3/1989 | Keir et al. | |
| 6,091,233 A * | 7/2000 | Hwang | H02M 1/4258 323/222 |
| 6,504,497 B2 | 1/2003 | Jang et al. | |
| 6,788,040 B2 | 4/2004 | Lubomirsky | |
| 6,788,557 B2 | 9/2004 | Phadke | |
| 6,879,140 B2 | 4/2005 | Elkin et al. | |

(Continued)

FOREIGN PATENT DOCUMENTS

| | | |
|---|---|---|
| CN | 204068702 | 12/2014 |
| EP | 0945968 | 9/1999 |

OTHER PUBLICATIONS

Balogh, Lazlo, et al., "Power-factor correction with interleaved boost converters in continous-inductor-current mode", 1993 IEEE, (1993), 168-174.

(Continued)

*Primary Examiner* — Rajnikant B Patel
(74) *Attorney, Agent, or Firm* — Schwegman Lundberg & Woessner, P.A.

(57) ABSTRACT

A power factor correction device for providing tolerance to a fault condition in an input supply can include a first boost circuit, a second boost circuit, and a controller circuit. The controller circuit can interleave operation of the first boost circuit and operation of the second boost circuit such as to generate an output voltage when the input supply is received at the power factor correction device. The controller circuit can route, in response to the fault condition, a stored supply of the second boost circuit to an input of the first boost circuit. The controller circuit can control the first boost circuit to maintain the output voltage.

20 Claims, 6 Drawing Sheets

(56) References Cited

U.S. PATENT DOCUMENTS

| | | | |
|---|---|---|---|
| 6,995,547 B2 * | 2/2006 | Yuan | H02M 1/34 323/222 |
| 7,061,212 B2 | 6/2006 | Phadke | |
| 7,408,795 B2 | 8/2008 | Vinciarelli | |
| 7,729,143 B2 | 6/2010 | Lin et al. | |
| 8,134,849 B2 | 3/2012 | Chang et al. | |
| 8,456,139 B2 * | 6/2013 | Phadke | H02M 1/4225 323/222 |
| 8,513,932 B2 * | 8/2013 | Yang | H02M 3/1584 323/282 |
| 8,736,240 B2 | 5/2014 | Liu et al. | |
| 8,872,384 B2 * | 10/2014 | Stratakos | H02J 3/383 307/104 |
| 8,872,485 B1 | 10/2014 | Kung | |
| 8,896,230 B1 * | 11/2014 | Zhang | G09G 3/36 315/224 |
| 8,947,145 B2 * | 2/2015 | Fujiwara | H02M 1/08 315/224 |
| 8,964,438 B2 | 2/2015 | Harrison | |
| 9,024,609 B2 | 5/2015 | Millavec | |
| 9,680,372 B1 | 6/2017 | Kellogg et al. | |
| 9,774,263 B1 | 9/2017 | Chen et al. | |
| 9,819,283 B2 * | 11/2017 | Mandavikhah | H02M 7/04 |
| 9,929,654 B2 * | 3/2018 | Ferdowsi | H02M 3/158 |
| 2005/0030772 A1 | 2/2005 | Phadke | |
| 2006/0039172 A1 | 2/2006 | Soldano | |
| 2007/0096700 A1 | 5/2007 | Weng et al. | |
| 2011/0110132 A1 * | 5/2011 | Rausch | H02M 1/4225 363/124 |
| 2011/0255314 A1 | 10/2011 | Kuebrich et al. | |
| 2013/0051101 A1 | 2/2013 | Cao et al. | |
| 2016/0149495 A1 | 5/2016 | Berke et al. | |
| 2016/0322898 A1 * | 11/2016 | Bianco | H02M 1/4225 |

OTHER PUBLICATIONS

Bridge, Chris, et al., "Understanding Interleaved Boundary Conduction Mode PFC Converters", Fairchild Semiconductor Power Seminar 2008-2009, (2009), 14 pgs.

Crews, Ron, et al., "Interleaving is Good for Boost Converters, Too", Power Electronics, [Online]. Retrieved from the Internet: <URL:http://www.powerelectronics.com/power-management/interleaving-good-boost-converters-too>, (May 1, 2008), 10 pgs.

Jang, Yungtaek, et al., "Hold-Up Time Extension Circuit With Integrated Magnetics", IEEE transactions on power electronics, vol. 21, No. 2, (Mar. 2006), 394-400.

Martin, Francis Alinea, "Isolated DC-DC Converter Topology Capable of Hold Up Time Extension", Department of Electrical and Electronics Engineering University of the Philippines, Diliman, (Oct. 2007), 1-26.

Miwa, Brett A., et al., "High Efficiency Power Factor Correction Using Interweaving Techniques", Laboratory for Electromagnetic and Electronic Systems—MIT, (1992), 557-568.

O'Loughlin, Michael, "Advantages of interleaved boost converters for PFC", EDN Network, [Online]. Retrieved from the Internet: <URL:https://www.edn.com/design/analog/4317419/Advantages-of-interleaved-boost-converters-for-PFC>, (Mar. 30, 2006), 1-5.

Skanda, Vinaya, et al., "Interleaved Power Factor Correction (IPFC) Using the dsPIC® DSC", Microchip—AN1278, (2009), 46 pgs.

Veerachary, M., et al., "Zero-voltage Switching of High-Gain Boost Converter", 1st IEEE International Conference on Power Electronics. Intelligent Control and Energy Systems, (2016), 1-6.

Wang, Chuanyun, "Investigation on Interleaved Boost Converters and Applications", Doctoral Dissertation, (2009), 202 pgs.

Yuan, Yisheng, et al., "A New Front-End Converter with Extended Hold-Up Time", College of Electrical and Electronics Engineer, East China Jiaotong University, Nanchang, China, (2007), 275-278.

"European Application Serial No. 18212066.7, Extended European Search Report dated Apr. 23, 2019", 8 pgs.

\* cited by examiner

US 10,367,411 B2

INTERLEAVED BOOST CONVERTER WITH HOLDUP TIME EXTENSION

FIELD OF THE DISCLOSURE

This document pertains generally, but not by way of limitation, to electronic power supplies, and more particularly, to power factor correction circuits.

BACKGROUND

A power supply typically converts an alternating current source to a direct current source for use by electronic devices. The architecture and operation of a power supply can introduce harmonics and cause differences between the phase of a voltage provided by the alternating current (AC) source and the phase of a current drawn from the AC source, reducing the power factor and, consequently, the efficiency, of the power supply. A power factor correction circuit, such as a boost converter, can be used to correct, or improve, the power factor of a power supply by reducing these phase differences and offsetting the effects of the harmonics. For example, an inductor in a boost converter circuit can be switched between a charging state and discharging state at a frequency, and with a modulated duty cycle, selected to, among other things, cause the power supply to generate a generally constant output voltage while causing the average current flowing through the inductor to align with, or to match, an expected inductor current (e.g., a current that is in phase with the AC source voltage). Since current through the inductor is drawn from the AC source, aligning the average inductor current with the AC source voltage can cause the AC source current to align with the AC source voltage, improving the power factor of the power supply. The power factor, and the overall efficiency, of the power supply can be further improved by interleaving the operation of, for example, two boost converters.

Industry regulations and device requirements can require a power supply to maintain a regulated output voltage for a threshold period of time (e.g., a holdup time) during fault conditions in the AC source (e.g., dropouts in the AC source voltage). Techniques for meeting these requirements can include adding energy storages devices (e.g., capacitors) to a power supply to extend holdup time during input supply faults. The added energy storage devices, however, can increase the size and costs the power supply. Additionally, the added energy storage devices can reduce power supply efficiency by reducing their power factor of a power supply. For example, storage capacitors added to the output of a power supply to extend holdup time can contribute to a phase difference between the AC source voltage provided to the power supply and AC source current drawn by the power supply.

SUMMARY OF THE DISCLOSURE

The present disclosure is based on the recognition that a power factor correction device for providing tolerance to a fault condition in an input supply can include a first boost circuit, a second boost circuit, and a controller circuit. The controller circuit can be configured to interleave operation of the first boost circuit and operation of the second boost circuit to generate an output voltage when the input supply is received at the power factor correction device. The controller circuit can be further configured to route, in response to the fault condition, a stored supply of the second boost circuit to an input of the first boost circuit. The controller circuit can be additionally configured to control the first boost circuit to maintain the output voltage.

The present disclosure is further based on the recognition that a system configured to provide providing tolerance to a fault condition in an input supply can include an input supply and a power factor correction circuit. The power factor correction circuit can include a first boost circuit, a second boost circuit, and a controller circuit. The controller circuit can be configured to interleave operation of the first boost circuit and operation of the second boost circuit to generate an output voltage when the input supply is received at the power factor correction device. The controller circuit can also be configured to route, in response to the fault condition, a stored supply of the second boost circuit to an input of the first boost circuit. The controller circuit can additionally be configured to control first boost circuit to maintain the output voltage.

The present disclosure is additionally based on the recognition that a method for operating a power factor correction device for providing tolerance to a fault condition in an input supply can include interleaving operation of a first boost circuit and operation of a second boost circuit to generate an output voltage from the input supply. The method can also include detecting a fault condition of the input supply. The method can additionally include routing, in response to the detected fault condition, a stored supply of the second boost circuit to an input of the first boost circuit to maintain the output voltage.

This overview is intended to provide an overview of subject matter of the present patent application. It is not intended to provide an exclusive or exhaustive explanation of the invention. The detailed description is included to provide further information about the present patent application.

Figure 1:
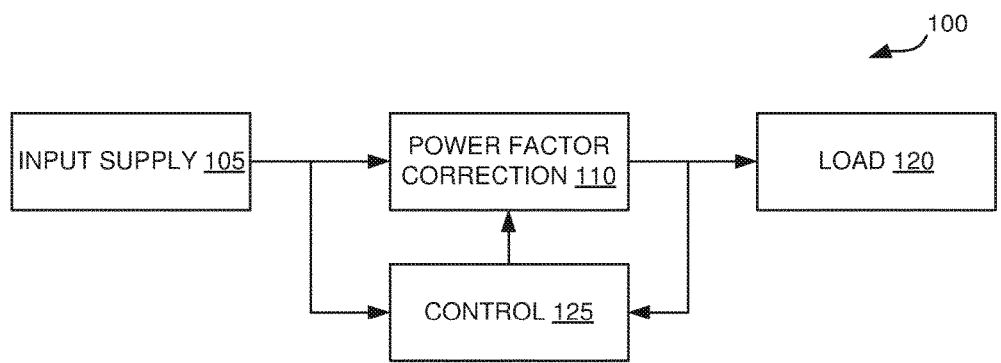
FIG. 1 depicts a block diagram of an example system having a power factor correction circuit configured with an integrated holdup time extension circuit.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure is based on the recognition that a power factor correction device for providing tolerance to a fault condition in an input supply can include a first boost circuit, a second boost circuit, and a controller circuit. The controller circuit can be configured to interleave operation of the first boost circuit and operation of the second boost circuit to generate an output voltage when the input supply is received at the power factor correction device. The controller circuit can be further configured to route, in response to the fault condition, a stored supply of the second boost circuit to an input of the first boost circuit. The controller circuit can be additionally configured to control the first boost circuit to maintain the output voltage.

The present techniques can be appreciated in the context of extending the holdup time, such as during an input supply fault, of an output voltage generated by a power supply, such as a linear power supply configured to covert an input supply (e.g., a AC line voltage) to a DC supply for operating electronic devices. Such electronic devices can include security systems, electronic medical equipment, industrial machines, consumer electronics, and computing systems. Integrating a holdup time extension circuit into an interleaved boost converter used as a power factor correction circuit can extend holdup time during a fault condition in a power supply at reduced cost and size, compared to other solutions. Existing output capacitors in each of a pair of boost converters of an interleaved boost converter circuit can be operated, respectively, as a primary energy storage device for maintaining an output voltage, and as a secondary energy storage device for recharging the primary energy storage device to extend holdup time. During a power supply fault, for example, the secondary energy storage device can be operated as an input to the boost converter having the primary energy storage device, thereby enabling the energy stored in the secondary energy storage device to discharge through the boost converter into the primary energy storage device. By using existing components of a power factor correction circuit to extend holdup time, the present techniques can provide power systems, including power supplies, that can comply with, or exceed, industry and product requirements, such as for efficiency and holdup time, such as at reduced costs and sizes.

For ease of discussion, the term holdup time is used herein, however, it is understood that the present techniques can also be useful with regards to meeting other input supply, or power supply, fault tolerance requirements.

Referring now to the figures, FIG. 1 depicts a block diagram of an example of a system 100 having a power factor correction circuit 110 configured with an integrated holdup time extension circuit. The system 100 can include an input supply 105, the power factor correction circuit 110, a load 120, and a control circuit 125. The system 100 can represent a general application of a power system in which the input supply 105 (e.g., an AC source) is conditioned by the power factor correction circuit 110 under the control of control circuit 125 to provide an output voltage to the load 120.

The input supply 105 can be any circuit configured to provide a rectified AC source, or any portion of a rectified AC source. For example, the input supply 105 can be configured to supply a rectified root-mean-square voltage between 93 and 264 volts. Phase shifts between the voltage provided by the AC source and a current drawn from the AC source can reduce the power factor of the input supply 105, thereby reducing the efficiency (e.g., the ratio between the portion of the power supplied by the input supply that does useful work and the total power supplied by the input supply). Harmonics in the AC source can also similarly reduce the power factor of the input supply 105.

Throughout this disclosure, the term input supply fault, input supply fault condition, and fault condition in the input supply, and can be used to indicate a condition that manifests as an interruption of, or an anomaly in, an AC source and/or a rectified AC source provided by the input supply 105. An input supply fault, for example, can be a partial or a complete attenuation, or dropout, of the rectified AC source for one or more cycles. Other input supply faults may be applicable to this disclosure.

The power factor correction circuit 110 can include passive or active electrical components that can be configured to adjust, or condition, the input supply 105 (e.g., the rectified AC source provided by the input supply) to offset the power factor reductions caused by AC source phase shifts and harmonics. For example, adjusting the input supply 105 can include adjusting (e.g., modulating) a current flowing through interleaved boost converts of the power factor correction circuit 110 such as to cause an average current drawn from input supply 105 to align with, or match the phase of, the voltage provided the input supply. The power factor correction circuit 110 can also include circuitry for extending the holdup time of the output voltage in response to an input supply fault, such as using techniques described herein.

The control circuit 125 can include one or more circuits to monitor power in the system 100, such as to actuate one or more components of the power factor correction circuit 110, such as to improve the power factor of input supply 105. The control circuit 125 can monitor the AC source power of the input supply 105, the current flowing through the power factor correction circuit 110, and the output of voltage of the power factor correction circuit, such as to determine how, and whether, to modulate the current drawn by the power factor correction circuit to improve the power factor of the input supply. The control circuit 125 can further include circuitry for controlling a holdup time extension circuit integrated in to the power factor correction circuit 110, such as described herein.

The load 120 can include a power conversion device, such as a DC-to-DC converter, such as can be configured to convert an output voltage provided by the power factor correction circuit 110 to a voltage usable by another electronic device or system. For example, the system 100, or the load 120, can require an output voltage provided by from the power correction circuit to be at a threshold voltage level (e.g., at or above a minimum voltage level) such as to support efficient operation of the load. The system 100, or the load 120, can also specify a holdup time requirement. The term holdup time, as used herein, generally refers to the length of time an output voltage provided by the power factor correction circuit 110 remains at, or above, a threshold voltage level during an input supply fault condition. Generally, holdup time can indicate a tolerance to input supply fault conditions.

Figure 2:
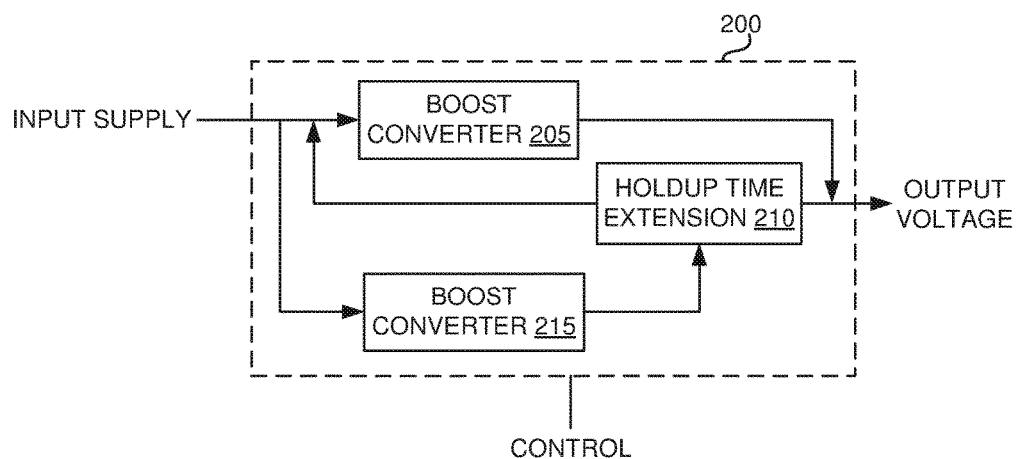
FIG. 2 depicts a block diagram of an example of a power factor correction circuit having interleaved boost converters and an integrated holdup time extension circuit.

FIG. 2 depicts a block diagram of an example of a power factor correction circuit 200 having interleaved boost converter circuits 205 and 215, and an integrated holdup time extension circuit 210. Although the holdup time extension circuit 210 is depicted as a separate circuit from the boost converter circuit 205 and boost converter circuit 215, the holdup time extension circuit can be integrated with, and can include one or more components of, one or more of the boost converter circuits. The power correction circuit 200 can be an example of the power factor correction circuit 110 (FIG. 1), and is generally useful to correct, or offset, reductions in the power factor of an input supply, such as the input supply 105 (FIG. 1). A control circuit, such as the control circuit 125 (FIG. 1), can interleave operation of the boost converter circuit 205 and operation the boost converter circuit 215 such as to cause the power factor correction circuit 200 to generate an output voltage with a high power factor (e.g., a power factor close to 1) such as in response to receiving an input supply.

The term interleave, or interleaving, as used herein, refers to alternately operating at least two circuits (e.g., operating two switching circuits to switch between two states at opposite times, or 180 degrees out of phase) to generate an output. Operation of the boost converter circuit 205 and operation the boost converter circuit 215, for example, can be interleaved by causing the boost converter circuit 205 to discharge for a first time period while the boost converter circuit 215 charges. The interleave operation can then be continued by causing the boost converter circuit 205 to charge for a second time period, while the boost converter circuit 215 discharges.

The term interleave, or interleaving, as used herein, can also refer to at least partially overlapping operating modes of two or more electronic circuits to generate an output. Operation of the boost converter circuit 205 and operation the boost converter circuit 215, for example, can be interleaved by causing the boost converter circuit 205 to discharge for a first time period, while the boost converter circuit 215 at least partially charges and discharges. The interleave operation can then be continued by causing the boost converter circuit 205 to at least partially charge and discharge for a second time period, while the boost converter circuit 215, for example, discharges.

While the power factor correction circuit 200 is operating in an interleaved mode (e.g., an operating mode during which the AC source to the input supply powering the power factor conversion circuit 200 does not have a fault condition), a control circuit can cause boost converter circuit 205 and boost converter circuit 215 to alternately store energy received from the input supply and discharge the stored energy though, for example, a load such as the load 120 (FIG. 1). Under such conditions, at least a portion of holdup time extension circuit 210 can provides a route for energy stored in the boost converter 215 to discharge through a load.

During an input supply fault condition (e.g., when the AC source to the input supply powering the power factor conversion circuit 200 drops out), the holdup time extension circuit 210 can be actuated (e.g., by the control circuit 125) to route stored energy of boost converter circuit 215 to the input of boost converter circuit 205. The boost converter circuit 205 can then use the stored energy of the boost converter circuit 215 as a substitute for the faulted input supply.

The holdup time extension circuit can be actuated, during an input supply fault condition, such as after the output voltage generated by the power factor correction circuit 200 drops to, or below, a threshold voltage level. The boost converter circuit 205 can use the stored energy of the boost converter circuit 215 to maintain the output voltage of the power factor correction circuit 200 at or above the threshold voltage level for a period of time, such as for extending the holdup of the power factor correction circuit 200.

Figure 3:
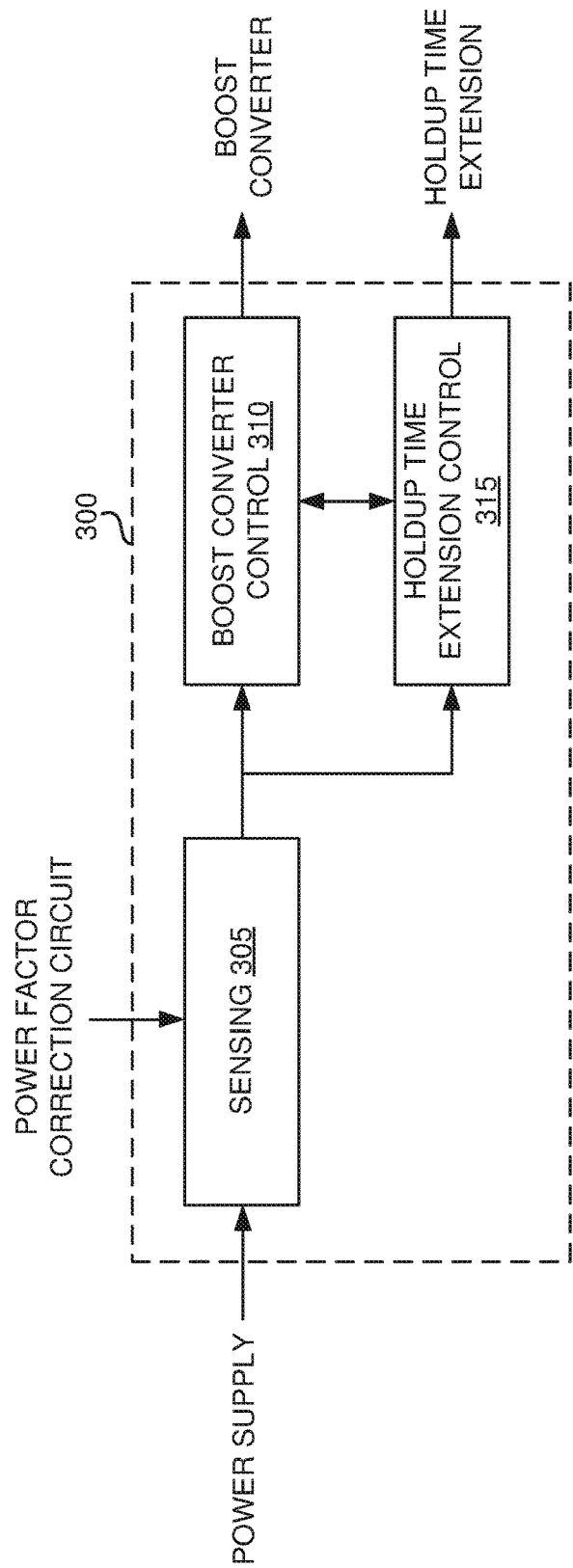
FIG. 3 depicts a block diagram of a control circuit for a power factor correction circuit having interleaved boost converters and an integrated holdup time extension circuit.

FIG. 3 depicts a block diagram of a control circuit 300 for a power factor correction circuit having interleaved boost converters and an integrated holdup time extension circuit. The control circuit 300 can implement the control circuit 125 (FIG. 1), and can be useful for operating the power factor correction circuit 200 (FIG. 2) to generate an output voltage when an input supply is received at the power factor correction circuit. The control circuit 300 can, for example, control the interleaving of the operation of the boost converter circuit 205 and the operation of the boost converter circuit 215 (FIG. 2). The control circuit 300 can actuate the holdup time extension circuit 210 (FIG. 2) to route, in response to an input supply fault condition, a stored supply of the boost converter circuit 215 to an input of the boost converter circuit 205 (FIG. 3) such as to maintain a power factor correction circuit output voltage at or above a threshold voltage level. The control circuit 300 can include a sensing circuit 305, a boost converter control circuit 310, and a holdup time extension control circuit 315.

The sensing circuit 305 can include circuitry and electrical componentry to monitor, for example, an AC source voltage and current of the input supply 105 (FIG. 1), currents flowing through the boost converters in the power factor correction circuit 200, and an output voltage of the of the power factor correction circuit. Generally, the sensing circuit 305 can include active and passive electrical componentry for monitoring one or more physical properties (e.g., magnitude, frequency, and phase) such as of voltages and currents in, for example, the system 100 (FIG. 1).

The boost converter control circuit 310 can include circuitry for interleaving the operation of, for example, the boost converter circuit 205 and the operation of boost converter circuit 215, such as described herein. The boost converter control circuit 310 can use an output of sensing circuit 305 such as to determine whether to adjust the current drawn by the power factor correction circuit 200 such as to modify the power factor of an input supply to the power factor correction circuit. The boost converter control circuit 310 can, for example, use an output of sensing circuit 305 determine a frequency and duty cycle modulation such as for alternating between the charging and discharging state of the boost converter circuit 205 and the boost converter circuit 215.

The holdup time extension control circuit 315 can include circuitry for operating the holdup time extension circuit 210 to route, in response to an input supply fault condition, a stored supply of the boost converter circuit 215 to an input of the boost converter circuit 205. For example, the holdup time extension control circuit 315 can control the boost converter circuit 205 to maintain the output voltage of the power factor correction circuit 200 such as using the stored energy of the boost converter circuit 215 as an input supply. The boost converter control circuit 310 can control the boost converter circuit 205 to maintain the output voltage of the power factor correction circuit 200 such as using the stored energy of the boost converter circuit 215 as an input supply.

Although the sensing circuit 305, the boost converter control circuit 310, and the holdup time extension control circuit 315 are shown as separate circuits, one or more of these circuits can be integrated with, and can include components of, other circuitry.

Figure 4:
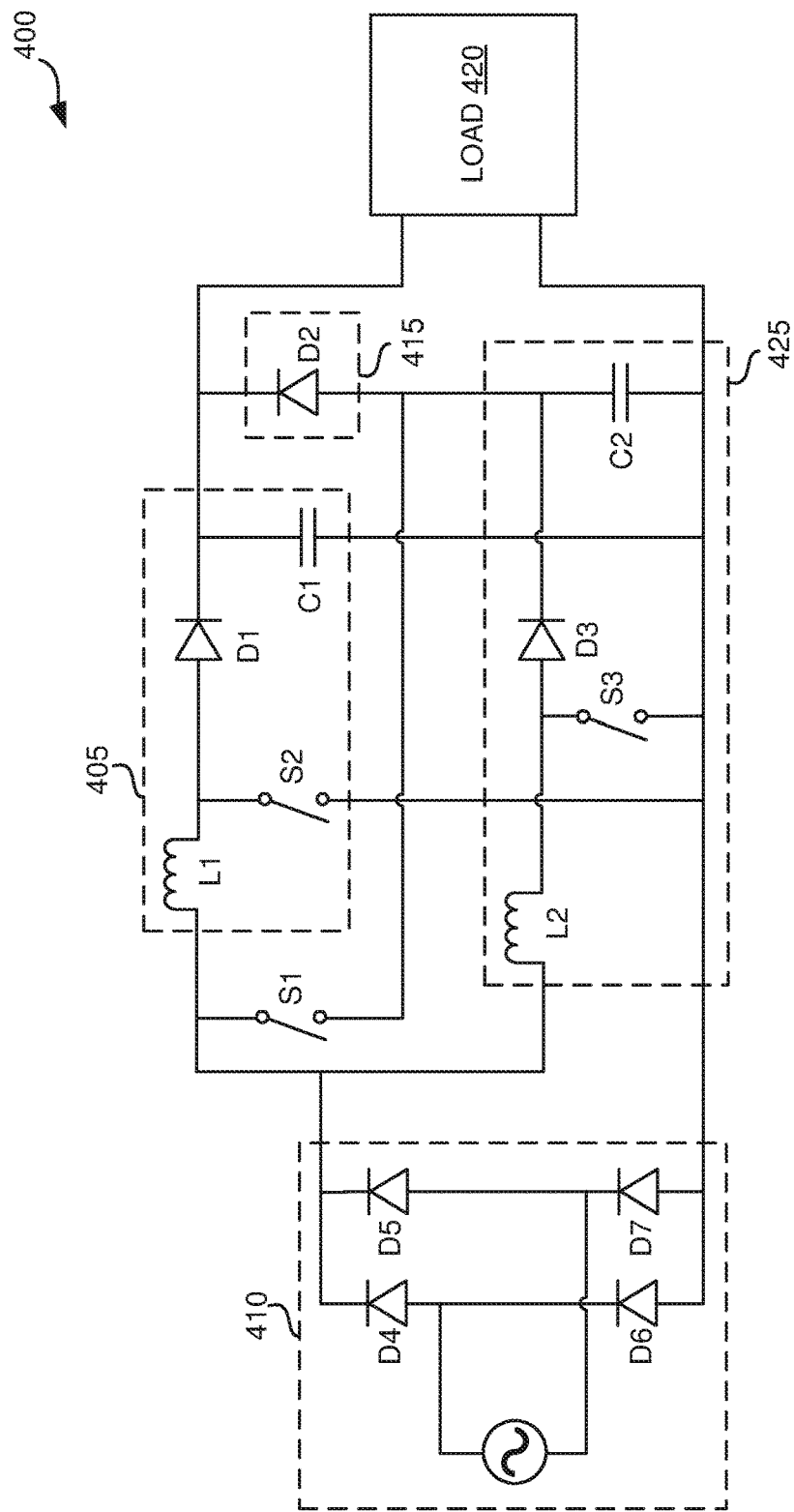
FIG. 4 depicts an example of a schematic diagram of a system having a power factor correction circuit with interleaved boost converters and an integrated holdup time extension circuit configured to operate in an interleaved mode.

FIG. 4 depicts an example of schematic diagram of a system 400 having a power factor correction circuit with an interleaved boost converter and an integrated holdup time extension circuit configured to operate in an interleaved mode. The system 400 can implement the system 100 with the control circuit 125 not shown. The system 400 can include input supply circuit 410 (e.g., an input supply), boost converter circuits 405 and 425, a load 420, and a holdup time extension circuit formed by semiconductor device 415 and switch S1. The holdup time extension circuit can further include an energy storage device, such as the capacitor C2.

The boost converter circuit 405 and the boost converter circuit 425 can be examples of the boost converter circuit 205 (FIG. 2) and the boost converter 215 (FIG. 2), respectively. The boost converter circuit 405 and the boost converter circuit 425 can configured with substantially the same components and can operate according to the same electrical principles, with the exception that operation of the boost converters can be generally interleaved such as to cause one boost converter to charge while the other boost converter discharges. Each of the boost converter circuit 405 and the boost converter circuit 425, for example, can generally include a charging or input energy storage device (e.g., an inductor L1 or an inductor L2), a discharging or output energy storage device (e.g., a capacitor C1 or a capacitor C2), a switching device (e.g., a switch S2 and a switch S3), and a biased semiconductor device (e.g., a diode, such as diode D1 or diode D3, or a diode-connected transistor).

During one interleaved mode operating phase of the power factor correction circuit formed by boost converter circuit 405 and boost converter circuit 425, the switch S2 is closed, while the switches S1 and S3 are open. In such a phase, the diode D1 is reverse biased, and a current can flow from the bridge rectifier formed by diodes D4, D5, D6, and D7, through the inductor L1 and the switch S2. The current charges inductor L1 (e.g., causes inductor L1 to store energy in a magnetic field), while the reverse biasing of diode D1 causes the capacitor C1 to discharge through the load 420. In the same operating phase, the inductor L2 discharges through capacitor C2 and the load 420, charging capacitor C2 in the process. In a second interleaving phase, the switch S3 is closed, while the switches S2 and S1 are open. During this second interleaving phase, the operation of the boost converter circuits 405 and 425 are interchanged (e.g., inductor L2 and capacitor C1 charge, while inductor L1 and capacitor C2 discharge).

In the interleaved mode, the capacitor C1 and the capacitor C2 generally form a single energy storage device when the diode D2 is forward biased (e.g., biased to enable an electrical current to flow). The combined stored energy of the capacitor C1 and the capacitor C2 can maintain the output voltage generated by the power factor correction circuit, such as by filtering ripples caused the charging and discharging of the inductor L1 and the inductor L2 while the input supply 410 is available (e.g., while there is no fault condition in the AC source powering input supply).

One or more of the switches S1, S2, and S3, can be an electronic switch (e.g., a semiconductor device such as a transistor) or an electrically controlled mechanical switch.

Figure 5:
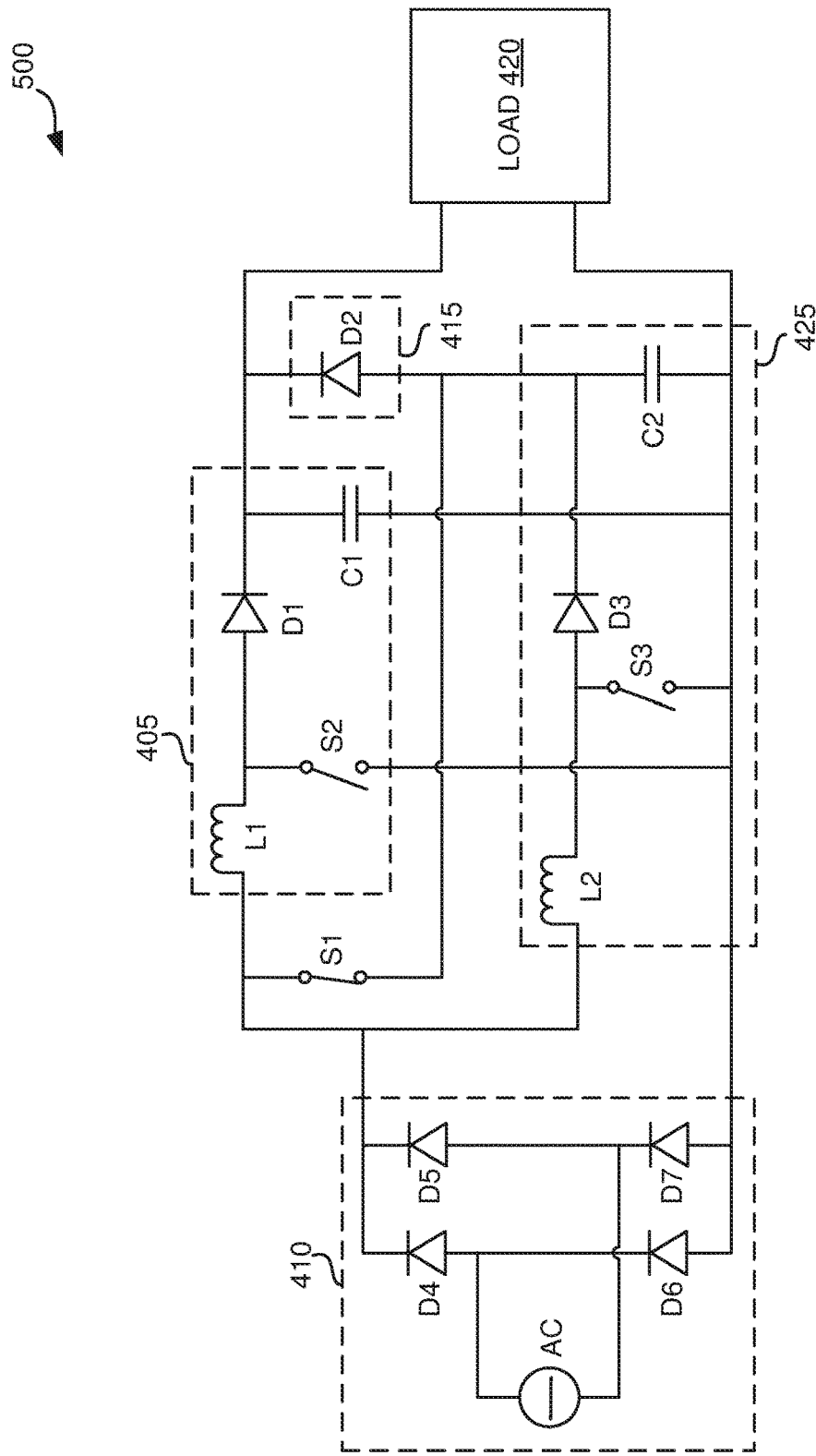
FIG. 5 depicts an example of a schematic diagram of a system having a power factor correction circuit with interleaved boost converters and an integrated holdup time extension circuit configured to operate in a holdup time extension mode.

FIG. 5 depicts an example of a schematic diagram of a system 500 having a power factor correction circuit with an interleaved boost converter and an integrated holdup time extension circuit configured to operate in a holdup time extension mode. The system 500 can be substantially the same as the system 400 (FIG. 4), but the switch S1 is closed and the AC source is not available (e.g., there is an AC source fault condition).

While the system 500 is in the holdup mode (e.g., an operating mode of the system 500 while there is a fault in the AC source), switch S1 is initially open, while the diode D2 is forward biased, connecting the capacitor C1 and the capacitor C2. The capacitor C1 and the capacitor C2 can discharge, such as until the output voltage of the power factor correction circuit reaches a threshold voltage level. The threshold voltage level can be determined by, for example, a specified voltage reference. A control circuit, such as the control circuit 300 (FIG. 3), can monitor the voltage at the output of the power factor correction circuit and can compare it to a reference voltage such as to determine when the capacitor C1 and the capacitor C2 has discharged to the threshold voltage level. The threshold voltage level can be specified as a percentage, or a fraction, of the normal interleaved mode output voltage (e.g., of the average interleaved mode output voltage) of the power factor correction circuit, or the normal operating voltage of the load 420. For example, the threshold voltage level can be specified as a minimum voltage for the load to operate efficiently. For example, the threshold voltage can be specified as at least 80% of the normal interleaved mode operating voltage.

Holdup time can represent the time it takes the capacitor C1 and the capacitor C2 to discharge enough to cause the output voltage of the power factor correction circuit to reach the threshold voltage level. Holdup time can be extended by closing switch S1 and controlling the switch S2 (e.g., switching or cycling the switch S2 at a particular frequency and with a particular duty cycle) such as to operate the boost converter circuit 405, and the system 500, in a holdup time extension mode.

The diode D2 becomes reverse biased (e.g., configured to inhibit a flow of electrical current), disconnecting (e.g., decoupling) the capacitor C2 from the load 420, during the holdup time extension mode. Closing the switch S2 while the switch S1 is closed causes a current to flow from the capacitor C2 through the switch S1, the inductor L1, and the switch S2, charging the inductor L1 using the stored energy of the capacitor C2. Subsequently opening the switch S2 charges the capacitor C1 using the previously stored energy of the capacitor C2 by discharging the inductor L1 through the capacitor C1 and the load 420. Repeating the process of closing and opening the switch S2, such as described, can transfer the stored energy of the capacitor C2 to the capacitor C1. Transferring the stored of energy from the capacitor C2 to the capacitor C1 in this manner can enable the capacitor C1 to maintain the output voltage of the power factor conversion circuit at, or above, the threshold voltage level.

The amount of time that the capacitor C2 is able to maintain the output voltage of the power factor conversion circuit at the threshold voltage level can be referred to as a holdup extension time. Generally, the holdup time and the holdup extension time can be determined, at least partially, by the capacitance value of capacitors C1 and C2, the threshold voltage level of the power factor correction circuit, and amount of current drawn by the load 420.

Figure 6:
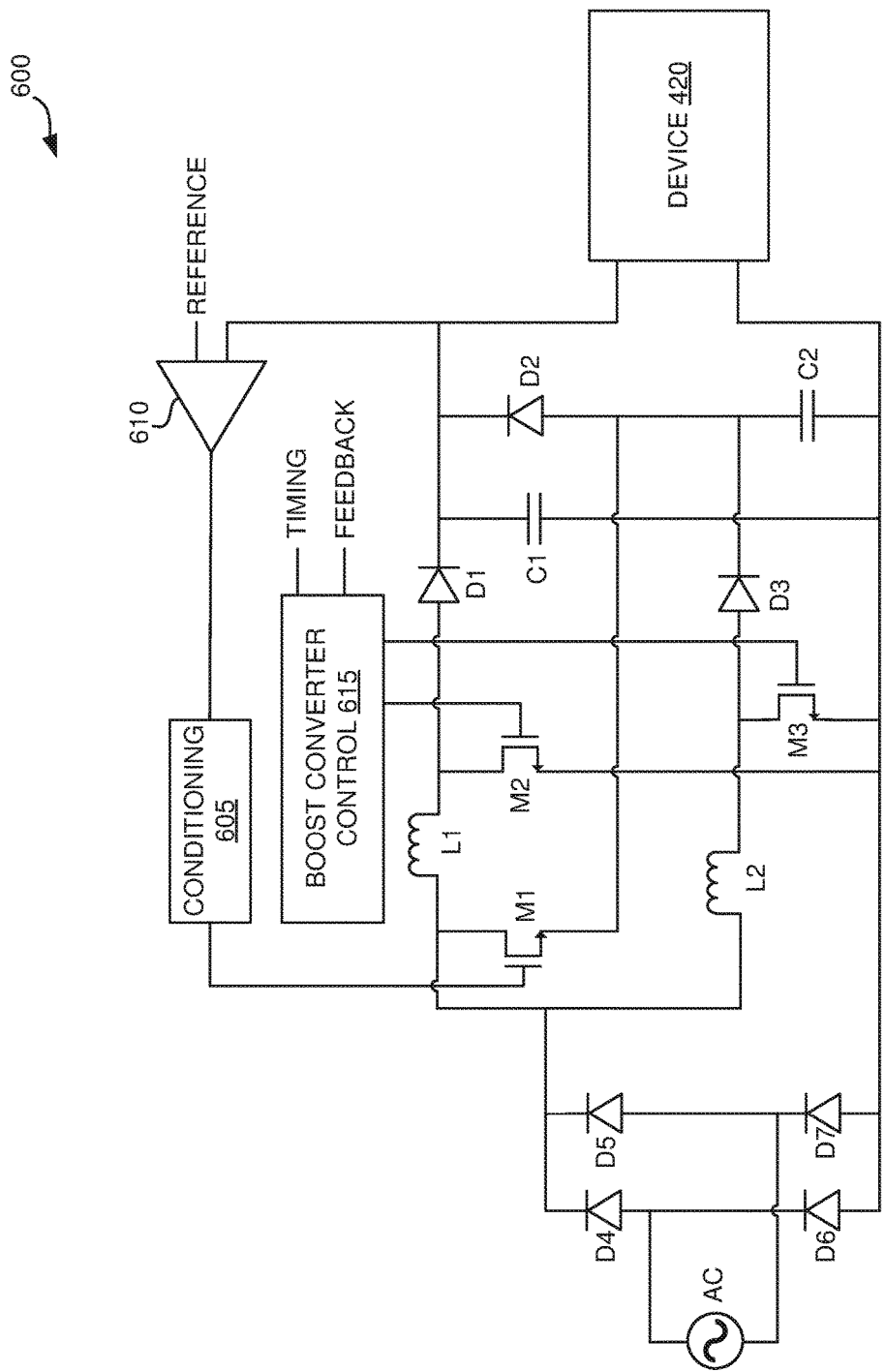
FIG. 6 depicts an example of a schematic diagram of a system having a power factor correction circuit with interleaved boost converters and an integrated holdup time extension circuit with semiconductor switches and control circuits.

FIG. 6 depicts an example of schematic diagram of a system 600 including a power factor correction circuit having interleaved boost converters and an integrated holdup time extension circuit with semiconductor switches and control circuits. The system 600 can implement the system 400 (FIG. 4), with the transistors (e.g., semiconductor devices) M1, M2, and M3 replacing, respectively, the switches S1, S2, and S3. The system 600 can additionally include a conditioning circuit 605, a comparison circuit 610 (e.g., an amplifier), and a boost converter control circuit 615.

Although the transistors M1, M2, and M3 are shown as N-channel field-effect transistors (FETs), the switches S1, S2, and S3 can be replaced with other switching devices, including, for example, bipolar junction transistors or other types of field effect transistors (e.g., P-channel FETs).

The conditioning circuit 605 and the comparison circuit 610 can be an example of the holdup time extension control circuit 315 and at least a portion the sensing circuit 305, such as shown in FIG. 3. The comparison circuit 610 can compare an output of the power factor correction circuit to a reference voltage. The output of the comparison circuit 610 can be conditioned (e.g., amplified, attenuated, or otherwise converted to a different voltage or signal), such as by conditioning circuit 605, and can be used to control the transistor M1 (e.g., the switch S1 in FIG. 5), such as described herein. The reference voltage can be a function, or a version, of the threshold voltage level of the power factor correction circuit providing power to the load 420.

The boost converter control circuit 615 can implement the boost converter control circuit 310, such as shown in FIG. 3. The boost converter control circuit 615 can use one or more feedback signals (e.g., measurements or indicators of the current or voltage supplied by an AC source, a current through the inductor L1 or L2, and an output voltage of the power factor correction circuit) such as can be provided by one or more sensing circuits such as to control the operation of the transistors M2 and M3 (e.g., the switches S2 and S3 in FIGS. 4 and 5), such as described herein.

Figure 7:
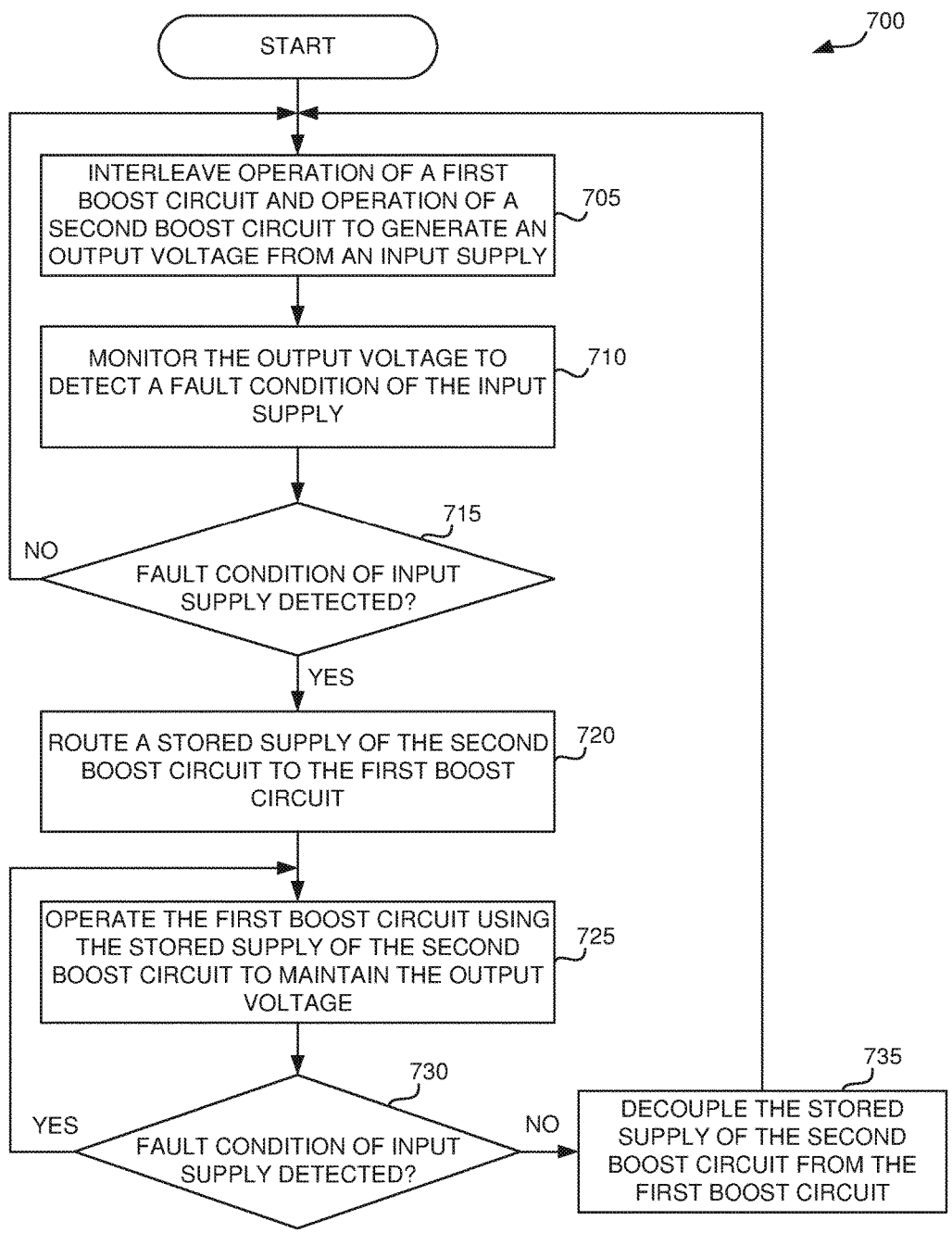
FIG. 7 depicts a set of operations for operating a power factor correction circuit having interleaved boost converters and an integrated holdup time extension circuit.

FIG. 7 depicts an example of a set of operations 700 for operating a power factor correction circuit having interleaved (e.g., alternatingly operated) boost converters with an integrated holdup time extension circuit. The operations 700 can be executed to, for example, provide tolerance to an input supply fault condition to the power factor correction circuit. The power factor correction circuit can include any of the power factor correction circuits depicted in, and described in the discussion of FIGS. 1-6. The operations 700 can be executed by a control circuit, such as the control circuit 125 (FIG. 1) or the control circuit 300 (FIG. 3).

At 705, the operation of a primary boost circuit and the operation of a secondary boost circuit in the power factor conversion circuit can be alternated or interleaved to cause the power factor correction circuit to generate an output voltage from an input supply. Such interleaving can include monitoring the current drawn from an AC source powering the input supply, the voltage provided by the input supply, the current through each boost converter circuit, and the output voltage of the power factor conversion circuit. Such interleaving can further include controlling the frequency or duty cycle, or both, of the charging and discharging of energy storage devices (e.g., inductors) in the boost converter circuits, such as described herein.

At 710, the output voltage of the power factor correction circuit can be monitored, such as to detect a fault condition in the input supply. The fault condition can include, for example, a dropout of the input supply voltage, or another anomaly in the input supply. At 715, a determination can be made as to whether a fault condition was detected at 710. Operations 705, 710, and 715 can be repeated in the absence of a fault condition being detected.

If a fault condition is detected, then, at 720, a stored supply of the secondary boost converter circuit can be routed to an input of the primary boost converter circuit, such as to maintain the output voltage of the power factor conversion circuit. Routing the stored supply can include electrically isolating an energy storage device (e.g., a capacitor) of the secondary boost converter circuit from the output of the power factor conversion circuit. Such isolating, for example, can include reverse biasing a semiconductor device (e.g., a diode) coupling the energy storage device to the output of the boost converter circuit. Routing the stored supply can further include electrically coupling the isolated energy storage device to the input of the primary boost converter circuit. The isolated energy storage device can be coupled to the input of the primary boost converter circuit such as by closing an electrical switch, or forward biasing a semiconductor device (e.g., a transistor), such as to create a closed path for a current to flow between the energy storage device and the primary boost converter.

At 725, the primary boost circuit can be operated using the stored supply of the secondary boost circuit such as to maintain the output voltage of the power factor correction circuit, such as described herein.

At 730, a determination can be made as to whether a fault condition is still detected. Operation 725 can be repeated while a fault condition is still detected. If the fault condition is not detected (e.g., an input supply is present), then, at 735, the stored supply of the secondary boost converter circuit can be decoupled from the primary boost converter circuit. Execution of the operations 700 can then continue at operation 705.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. An interleaved boost converter for generating an output voltage, the interleaved boost converter comprising:
    a first boost circuit;
    a second boost circuit; and
    a controller circuit configured to:
    route, using a switching element coupled to the first boost circuit and to the second boost circuit, a stored supply of the second boost circuit to an input of the first boost circuit to maintain the output voltage.

2. The interleaved boost converter of claim 1, wherein:
    the first boost circuit includes a first energy storage device;
    the second boost circuit includes a second energy storage device, the second energy storage device coupled to the first energy storage device; and
    routing the stored supply includes decoupling the second energy storage device from the first energy storage device and coupling the second energy storage device to the input of the first boost circuit.

3. The interleaved boost converter of claim 2, wherein:
    the second energy storage device is coupled to the first energy storage device through a semiconductor device; and
    the decoupling includes biasing the semiconductor device to inhibit current flow through the semiconductor device.

4. The interleaved boost converter of claim 3, wherein the semiconductor device is a diode, and wherein the decoupling includes reverse-biasing the diode.

5. The interleaved boost converter of claim 2, wherein routing the stored supply includes transferring at least a portion of energy of the stored supply from the second energy storage device to the first energy storage device using the first boost circuit.

6. The interleaved boost converter of claim 2, wherein at least one of the first energy storage device and the second energy storage device includes a capacitor.

7. The interleaved boost converter of claim 2, wherein the second energy storage device is coupled to the input of the first boost circuit through a transistor controlled by the switching circuit.

8. The interleaved boost converter of claim 1, wherein the switching circuit is further configured to control the first boost circuit to maintain the output voltage by causing the first boost circuit to alternate between charging a third energy storage device in the first boost circuit using the stored supply and discharging the third energy storage device through the first energy storage device.

9. The interleaved boost converter of claim 1, wherein the switching circuit is configured to detect the fault condition by detecting a drop in the output voltage below a threshold level.

10. The interleaved boost converter of claim 1, wherein the switching circuit is further configured to control the first boost circuit to maintain the output voltage by operating the first boost circuit as a boost converter using the stored supply as an input.

11. The interleaved boost converter of claim 8, wherein the third energy storage device is an inductor configured at the input of the first boost converter to receive routed stored supply of the second boost circuit.

12. A system configured to provide providing tolerance to a fault condition in an input supply, the system comprising:
    an input supply; and
    a power factor correction circuit, the power factor correction circuit comprising:
    a first boost circuit,
    a second boost circuit, and
    a controller circuit configured to:
    interleave operation of the first boost circuit and operation of the second boost circuit to generate an output voltage when the input supply is received at the power factor correction device,
    route, after the fault condition, a stored supply of the second boost circuit to the first boost circuit.

13. The system of claim 12, wherein:
    the first boost circuit includes a first energy storage device;
    the second boost circuit includes a second energy storage device, the second energy storage device coupled to the first energy storage device; and
    routing the stored supply includes decoupling the second energy storage device from the first energy storage device and coupling the second energy storage device to the input of the first boost circuit.

14. The system of claim 13, wherein:
    the second energy storage device is coupled to the first energy device through a semiconductor device; and
    the decoupling includes biasing the semiconductor device to inhibit current flow through the semiconductor device.

15. The system of claim 14, wherein the semiconductor device is a diode, and wherein the decoupling includes reverse-biasing the diode.

16. The system of claim 14, wherein routing the stored supply includes transferring at least a portion of energy of the stored supply from the second energy storage device to the first energy storage device using the first boost circuit.

17. A method for operating a interleaved boost converter for generating an output voltage, the method comprising:
  interleaving operation of a first boost circuit and operation of a second boost circuit to generate an output voltage from the input supply;
  detecting a fault condition of the input supply; and
  routing, after detecting the fault condition, a stored supply of the second boost circuit o the first boost circuit to maintain the output voltage.

18. The method of claim 17, wherein:
  the first boost circuit includes a first energy storage device;
  the second boost circuit includes a second energy storage device, the second energy storage device coupled to the first energy storage device; and
  routing the stored supply includes decoupling the second energy storage device from the first energy storage device and coupling the second energy storage device to the input of the first boost circuit.

19. The method of claim 17, wherein:
  the second energy storage device is coupled to the first energy device through a semiconductor device; and
  the decoupling includes biasing the semiconductor device to inhibit current flow through the semiconductor device.

20. The method of claim 17, wherein the routing includes controlling the first boost circuit to maintain the output voltage includes causing the first boost circuit to alternate between charging a third energy storage device in the first boost circuit using the stored supply and discharging the third energy storage device through the first energy storage device.

* * * * *